United States Patent

[11] 3,628,148

[72] Inventor Stephen J. Brolin
Bronx, N.Y.
[21] Appl. No. 887,657
[22] Filed Dec. 23, 1969
[45] Patented Dec. 14, 1971
[73] Assignee Bell Telephone Laboratories, Incorporated
Murray Hill, N.J.

[54] ADAPTIVE DELTA MODULATION SYSTEM
6 Claims, 7 Drawing Figs.

[52] U.S. Cl. .......... 325/38 B, 178/68, 328/56, 332/11 P
[51] Int. Cl. .......... H03k 13/22
[50] Field of Search .......... 325/38 B; 178/5.4 P, 5.4 CR, 68; 328/19, 20, 38, 66, 67, 55, 56; 329/145; 332/11 P

[56] References Cited
UNITED STATES PATENTS

| | | | |
|---|---|---|---|
| 2,437,313 | 3/1948 | Bedford | 328/56 X |
| 2,816,267 | 12/1957 | De Jager et al. | 332/11 P |

*Primary Examiner*—Benedict V. Safourek
*Attorneys*—R. J. Guenther and E. W. Adams, Jr.

ABSTRACT: An adaptive delta modulation system is characterized by an encoder algorithm having a plurality of unique states. A combinational circuit receives a feedback signal from the transmitted signal and a state signal on the basis of which a step of a size dependent upon the state and the transmission is applied to the integrator by the combinational circuit, which also generates a new state signal.

4 Sheets-Sheet 1

INVENTOR
S. J. BROLIN
BY David P. Kelley
ATTORNEY

NO BOGUS

BOGUS

ADAPTIVE DELTA MODULATION SYSTEM

BACKGROUND OF THE INVENTION

This invention relates to digital message transmission systems, and, more particularly, to variable step size, or adaptive, delta modulation systems.

In conventional delta modulation systems, an analog signal to be encoded and transmitted is periodically sampled, and the sample is then compared with the output of an integrator circuit which is controlled by the transmitted pulse signal. This transmitted signal is a train of positive or negative pulses, or marks and spaces, occurring at a constant rate. These transmitted pulses are also fed back to the integrator to increase or decrease its output in single value steps. Because the steps are single value, one of the inherent drawbacks to delta modulation is the inability of the encoder, i.e., the integrator output, to follow a rapidly changing analog input signal. This inability, and the consequent encoding error is referred to as slope overload noise. The problems presented by this form of noise are particularly acute in the encoding of, for example, video signals, which are characterized by frequently occurring almost instantaneous changes in signal amplitude. The problem of slope overload cannot be satisfactorily corrected by using a large unit step size, since then there would be increased quantizing noise for smaller signals with a consequent overall degradation of the encoder noise performance.

In order to overcome these limitations and still preserve the benefits of delta modulation, a form of delta modulation which adapts itself automatically to changing signal parameters has become the subject of much study and investigation. In its simplest form this adaptive delta modulation monitors the pulse output of the encoder and, in response to the pulse sequence, changes the step size of the integrator input, and hence the magnitude of the integrator output quantum. For example, when slope overload occurs, the output of the encoder is a succession of pulses of like polarity, e.g., positive pulses. In response to this succession of pulses, the control or monitor circuit increases the quantum step size. If the pulse polarity remains unchanged, the step size is again increased, as by doubling the previous step size, and the process continues until a reversal of polarity in the output pulse train indicates that the integrator output to the comparator has exceed the input signal magnitude, whereupon the step is reversed in polarity and its size is reduced. A common sequence of increments is 1, 2, 4, 8, 16 --- $2^n$, and, at polarity reversal, the increment is one-half the increment preceding reversal. Thus the progression of integrator output levels may by 1, 2, 4, 8, 16, 32, 64, 48, 32, when the polarity reversal occurs at 64. There are numerous variations of the foregoing step sequence. In most cases, the adaptive delta modulation system may be looked upon as a simple delta modulation system with companding.

Even with present-day adaptive delta modulation systems there occur certain types of errors which contribute to an overall degradation of the signal transmission system. One particular recurring error is the phenomenon known as "edge busyness" which is a particularly acute problem in the encoding of television signals. This "edge busyness" results from the random phasing of the coder timing signals with respect to the analog signal. Thus, for example, in a video signal representing a sharp transition in the picture from black to white, each successive scan can be phased slightly differently with respect to the delta modulation pulses, resulting in a definite movement or wavering of the sharp edge in the reproduced picture.

Where the slope of the analog signal is quite steep, there often occurs a definite lag in the escalation of the step sizes, and frequently a subsequent large overshoot of the analog signal, which produces in the encoder a pulse reversal, and a "hunting" about the actual signal with consequent large quantizing errors.

SUMMARY OF THE INVENTION

The present invention is an adaptive delta modulation system which eliminates or materially reduces the signal degradation resulting from the foregoing phenomena.

In an illustrative embodiment of the invention, the analog signal to be encoded is applied to a comparator where it is compared with the output of an integrator and a positive or negative pulse (or pulse - no pulse) is generated in accordance with the difference. The pulse signal thus generated is transmitted, and, at the same time, applied to a combinational circuit. The combinational circuit also receives an an input a digital indication of the past history of the encoding sequence, or, more precisely, a digital indication of the state of the encoding sequence based upon the past history thereof. On the basis of the pulse input and the state input, the combinational circuit generates a new state signal which is applied to a holding circuit and simultaneously generates a pulse size and polarity signal which is applied to a pulse-forming circuit, the pulse output of which is applied to the integrator.

The state signal in the hold circuit is gated to a second hold circuit the output of which is applied to the combinational circuit concurrently with the next successive code pulse in the encoder output. The operation of the combinational circuit is governed by an algorithm or state diagram designed to produce optimum performance of the encoder as will be explained more fully hereinafter.

The output of the first state signal hold circuit is also applied to a second combinational circuit which generates a decision level signal in accordance with the aforementioned algorithm. This level signal is applied to a level-shifting circuit whose output is applied to the comparator to raise or lower the decision level in accordance with the particular state of the encoding sequence, to minimize the quantizing error for the next succeeding comparison, in a manner to be explained more fully hereinafter.

As an adjunct to the foregoing illustrative embodiment, a "-bogus" signal generator is situated in series between the analog signal source and the comparator. This generator delays the input signal one time period or more and combines it with the signal then present at the input to the generator to create a "bogus" signal which permits the encoder to get a headstart on an input signal having a large slope, i.e., rapid rise, thereby permitting the logic circuitry of the encoder to commence the escalation of the step size. In this way the inherent delay of the encoder is reduced and the steep slope is tracked more closely.

It is a unique feature of the present invention that a running record is kept of the state of the encoding process in accordance with its algorithm, and associated with any given state is a particular decision level and set of step sizes. The only memory involved is that of remembering what state the system is in. No memory of output pulses is necessary. With such an arrangement a more accurate selection of step size is possible than with prior art systems which rely on a record of a fixed number of preceding output pulses to determine the appropriate step size and polarity.

DESCRIPTION OF THE DRAWINGS

This and other features of the present invention will be more readily apparent from the following detailed description read in conjunction with the accompanying drawings, in which:

The adaptive delta modulation (DM) encoder of FIG. 1 comprises a comparator circuit 11 to which are applied, from a suitable source, not shown, analog signals to be encoded. As shown in FIG. 1, the analog signals are applied to a "bogus" signal circuit 12, the output of which is applied to the comparator 11 as the analog input thereto. As will be explained more fully hereinafter, the "bogus" signal circuit 12 performs a special function which is advantageously used with certain types of analog signals. For certain types of signals it may be omitted entirely.

Figure 1:
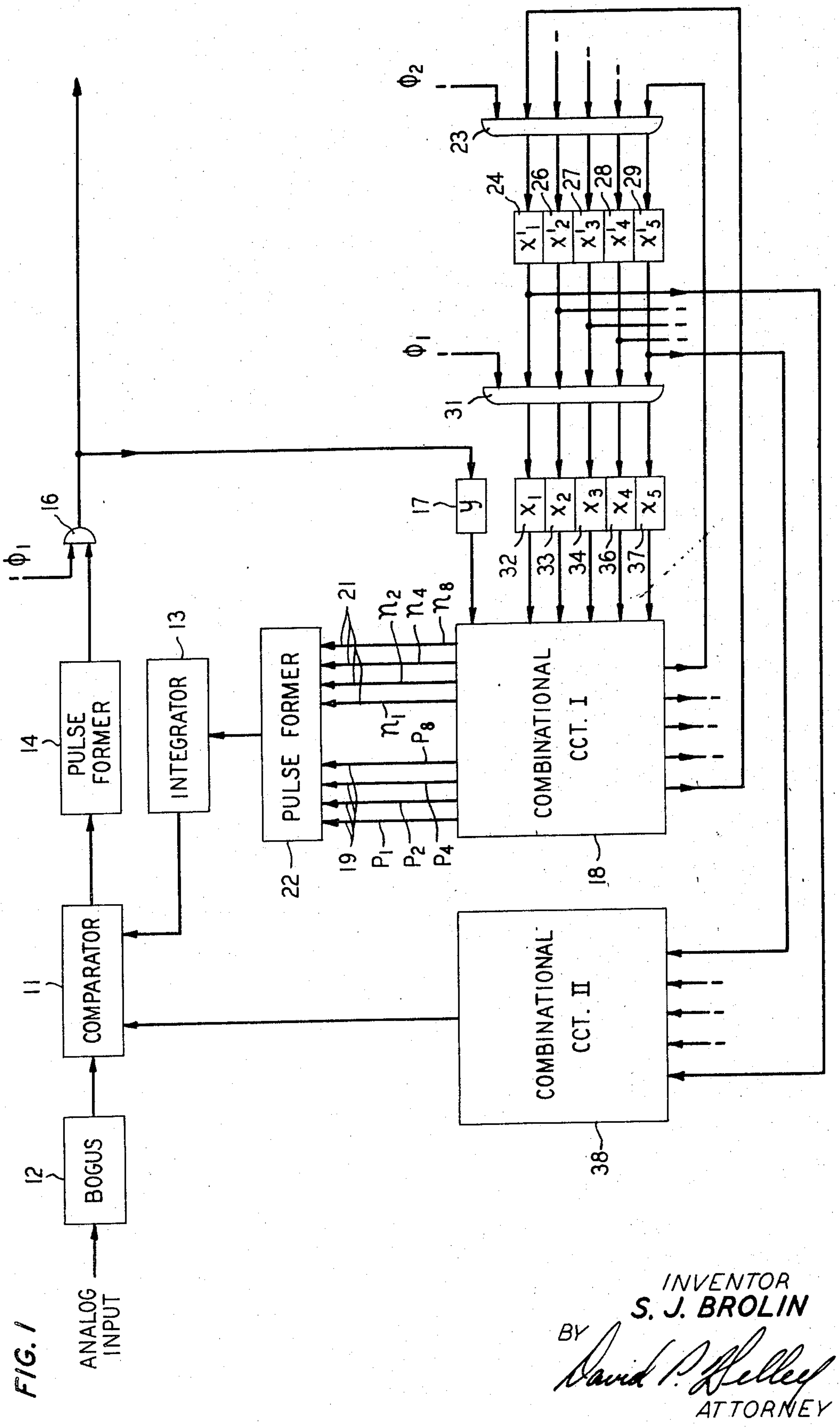
FIG. 1 is a block diagram of an adaptive delta modulation encoder embodying the principles of the present invention.

The output of comparator 11, which compares the analog signal and the output of an integrator circuit 13 is a signal indicative of the polarity of the difference. That is, a signal indicating whether the analog signal exceeds or is less than the integrator output. This signal is applied to a pulse-forming circuit 14 which produces a positive or negative pulse, or, more commonly, a pulse or no pulse, depending upon the sign of the difference. The pulse former output is directed to an AND gate 16 which also has as an input clock pulses $0_1$ from a suitable clock pulse source, not shown. The output of the AND gate 16 is a transmitted string of positive and negative pulses, or, more commonly, pulses and spaces, at the clock rate, and indicative of the differences between the analog signal and the output of integrator 13.

The output of AND gate 16 is also fed back to a storage circuit 17, which may, for example, take the form of a simple flip-flop. The output of circuit 17 is fed to a combinational circuit 18 which, as will be explained more fully hereinafter, keeps track of the state of the encoder, i.e., where in the algorithm of the encoding process the encoder is operating at the instant of reception of the signal from circuit 17, and produces an output on one of a plurality of positive leads 19 or one of a plurality of negative leads 21. The leads 19 and 21 are directed to a pulse former circuit 22 which generates a pulse of a magnitude and polarity that depends upon which one of the plurality of leads 19 or plurality of leads 21 carried the signal from combinational circuit 18. This pulse is applied to integrator circuit 13 to alter the step size.

At the same time, combinational circuit 18 generates a five-digit binary state signal comprising the state variables $x_1'$, $x_2'$, $x_3'$, $x_4'$, and $x_5'$ which is applied through an AND gate 23, under control of a clock $0_2$ to a bank of five storage devices 24, 26, 27, 28, and 29, which may, for example, comprise five parallel flip-flops. The output of the devices 24, 26, 27, 28, and 29 is applied through an AND gate 31 upon occurrence of a $0_1$ clock pulse to a second bank of storage devices 32, 33, 34, 36, 37 whose output is applied to circuit 18 concurrently with the output of circuit 17.

The binary state signal stored in elements 24, 26, 27, 28, and 29 is also applied to a second combinational circuit 38 which changes the decision level of comparator 11 in accordance with the instantaneous state of the encoder.

Figure 2:
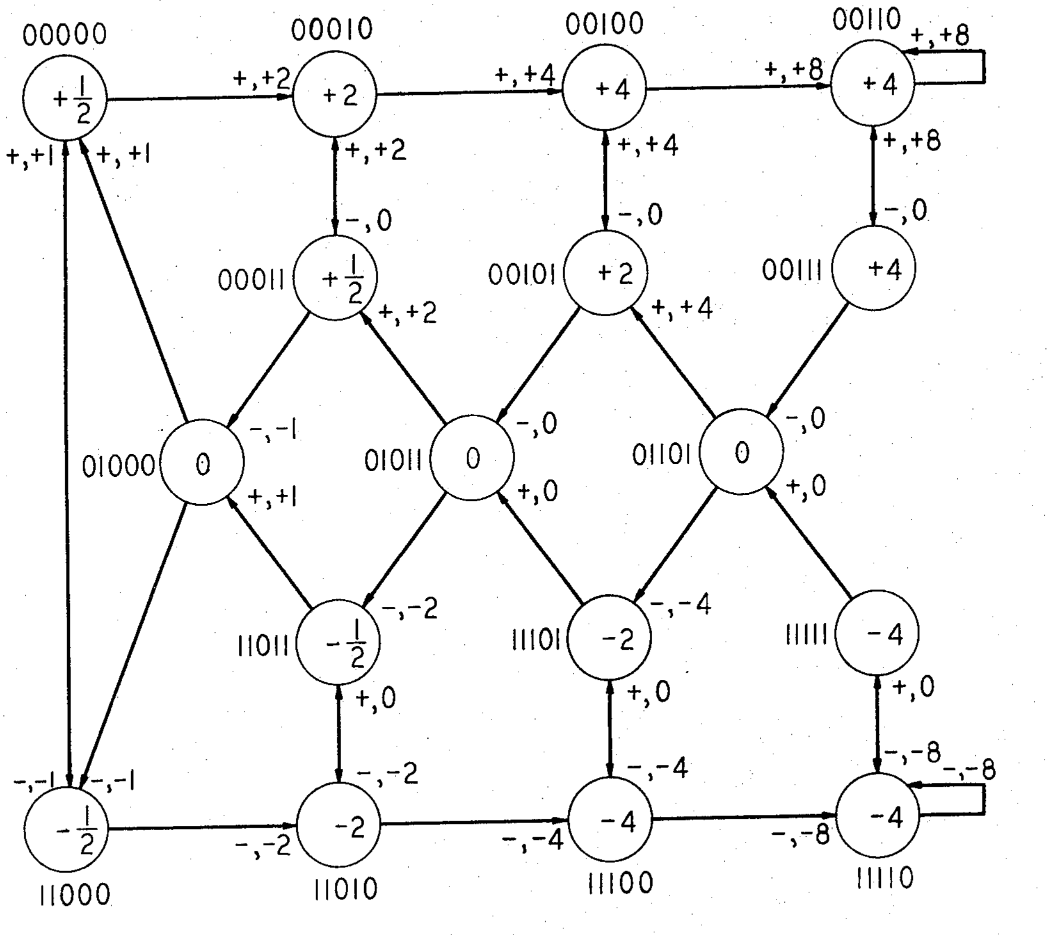
FIG. 2 is a state diagram of the encoder of FIG. 1.

The operation of the encoder circuit of FIG. 1 can be more readily understood by reference to FIG. 2 which is a state diagram of a preferred algorithm of the encoder circuit of FIG. 1. There are, in all, 17 states depicted by circles, each with its own unique five-digit designation. Thus the state in the upper left-hand corner of the diagram is coded 00000, that in the lower right-hand corner 11110, and so forth. In the following discussion, each state will be referred to by its code.

When there is no signal input to the circuit of FIG. 1, the state of the encoder alternates between state 00000 and state 11000. Assume that at a given instant it is in state 00000. The integrator 13 output is a +1, hence the comparator 11 produces a negative indication and the output of gate 16 is either a negative or no pulse. Consequently circuit 17 applies a negative indication to combinational circuit 18 along with the code 00000 from elements 32, 33, 34, 36, and 37. Upon receipt of this particular combination of decision and code, combinational circuit generates a negative signal on the first of the leads 21, designated $n_1$. This causes pulse former 22 to generate a −1 which is applied to integrator 13. At the same time, combinational circuit 18 generates the new state code 11000 which is applied to elements 24, 26, 27, 28, and 29 through gate 23 upon occurrence of clock pulse $0_2$.

Figure 3:
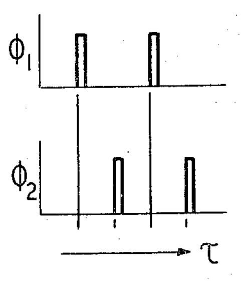
FIG. 3 is a diagram of the phase relationship of timing pulses used in the encoder of FIG. 1.

Upon the occurrence of clock pulse $0_1$, which is the time when the encoder output is fed back to element 17, AND gate 31 is activated and the state code 11000 on elements 24, 26, 27, 28, and 29 is transferred to elements 32, 33, 34, 36, and 37, and thence to combinational circuit 18 along with the output of element 17. The phase relationship of clock pulses $0_1$ and $0_2$ is shown in FIG. 3. Both sets of pulses occur at the same rate, and may be generated by a single source. Clock pulses $0_2$, however, are shifted in phase relative to pulses $0_1$. Pulses $0_2$ have the effect of preparing the circuit for the occurrence of pulses $0_1$. Such an arrangement of gates 23 and 31 and pulses $0_1$ and $0_2$ eliminates the possibility of a race condition which would prevent proper operation of the encoder.

The output of gate 16 at the occurrence of $0_1$ was a positive pulse, hence circuit 17 produces a positive indication. When this is applied to circuit 18 with the state code 11000, circuit 18 produces an output on the first of the positive leads 19, designated $p_1$, causing pulse former 22 to apply a +1 to integrator 13. At the same time, circuit 18, upon receipt of a positive indication from element 17 and the state code 11000 generates the state code 00000 for application to members 24, 26, 27, 28, and 29. Thus it can be seen that in the quiescent condition the encoder alternates between states 00000 and 11000, as indicated by the arrows in FIG. 2. The figures +, +1 associated with state 00000 and −, −1 associated with state 11000 indicate the output of element 17 and pulse former 22 respectively which occur in the change to the state with which they are associated.

Figure 4A:
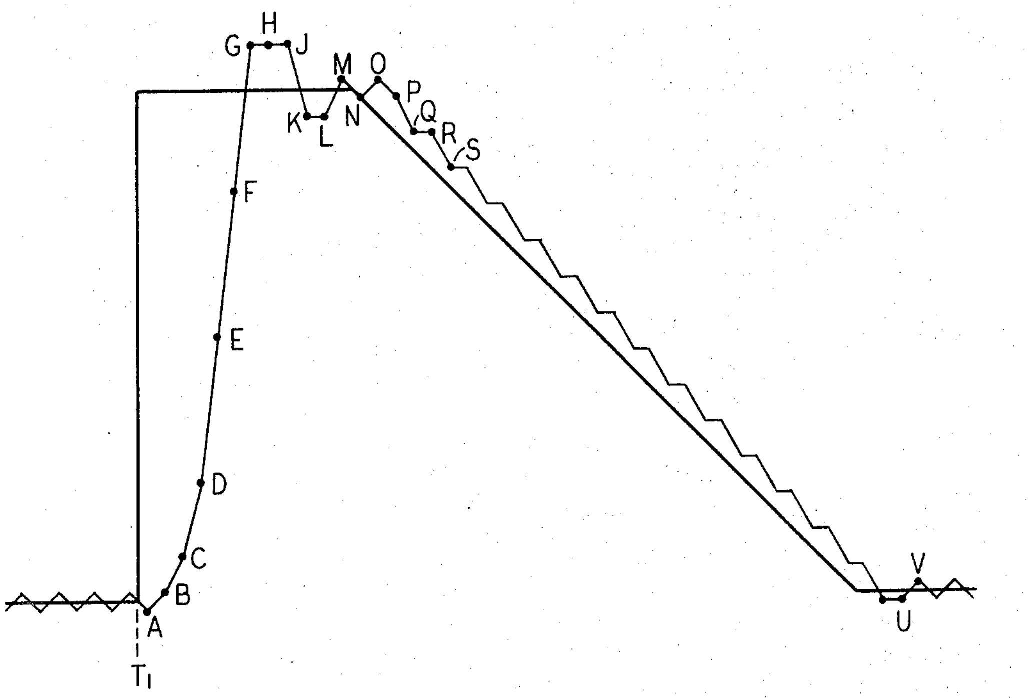
FIG. 4A is a diagram of the encoder performance for a particular analog input.

In FIG. 4A there is depicted the performance of the encoder of FIG. 1 for an input signal having a rapid or vertical rise, and a subsequent gradual or sloping fall. The operation depicted in FIG. 4A is without the bogus signal generator 12. Operation with this element in the circuit will be discussed in connection with FIG. 4B. Initially the encoder is in the quiescent condition, alternating back and forth between states 00000 and 11000 as described heretofore. As can be seen in FIG. 4A, this results in an integrator output of alternate +1's and −1's. When, at $T_1$, there is an analog signal input in which the signal has a vertical rise, as shown, the encoder is in the process of passing from state 00000 to state 11000. This particular timing is for illustrative purposes only. The signal input could occur at any point of the cycle. At point A after $T_1$ the encoder is in state 11000. The comparator 11 produces a positive output, circuit 17 produces a positive output, combinational circuit 18 produces an output on lead $p_1$ and the integrator 13 output is as indicated at B, while the encoder shifts to state 00000. At this time the comparator 11 again produces a positive indication, as does element 17. Combinational circuit 18, upon receipt of a positive indication from circuit 17 and the state signal 00000 generates an output on the second lead 19, designated $p_2$, which causes pulse former 22 to apply a pulse of twice the magnitude of the preceding pulse to integrator 13, the integrator output being indicated at point C, and the state signal output of circuit 18 is 00010. Since the signal still exceeds the integrator output, the next comparison again results in a positive indication, and the output of circuit 18 to pulse former 22 is on the lead 19 designated $p_4$, causing a step of four units of amplitude, that is, double the amplitude of the previous step, with the output of the integrator to be applied to integrator 13, as indicated at point D. Circuit 18 responds to the positive signal from element 17 and the state signal 00010 from elements 32, 33, 34, 36, and 37 to produce a new state signal output 00100.

The next comparison again produces a positive indication and the input from circuit 18 to circuit 22 is on $p_8$ of lead 19, again doubling the input to integrator 13, as shown at point E. The state output of circuit 18 becomes 00110. The step size remains at 8 through points F and G, and the state signal remains the same, until the integrator output exceeds the signal, as shown at point G, at which time the comparator 11 produces a negative indication. In prior art encoders, a negative indication at this point produces a negative input to the integrator, reducing its output to below the signal magnitude. On certain types of signals, particularly those with a sloping, but not vertical rise, this action results in large excursion hunting about the signal value, with a consequent increase in quantizing noise and "edge busyness." In the present invention, as can be seen in FIG. 2, when the encoder is in any of the states 00010, 00100, or 00110 and a negative indication is produced by comparator 11, no change is made in the integrator output, and the new state signal becomes 00011, 00101, or 00111, respectively as shown. This is shown in FIG. 4 as point H for state 00111. Such an algorithm permits resumption of increases in the steps or maintenance of the same step size if the signal continues to rise within one time period, whereas in prior art arrangements, several steps are often required to return to the appropriate step size, thereby producing greater quantizing noise. As a consequence, the encoder of the present invention follows or tracks the analog signal more accurately than prior art encoders. Not only does this improvement in tracking result in less quantizing noise, it also materially reduces "edge busyness" because of the fewer changes in stp size, or changes in step direction.

At point H the comparator again produces a negative indication, and, as can be seen from FIG. 2 and point J of FIG. 4, there is again no change in integrator output, but the state changes to 01101. Inasmuch as the integrator output still exceeds the signal level, another negative indication is made, combinational circuit generates a signal on lead $n_4$ of leads 21, and pulse former 22 applies a step of −4 units (one-half the last step change) and the state of the encoder shifts to 11101, with the appropriate signal being applied to gate 23 from circuit 18. The integrator output is then as indicated at point K. At point K the comparator 11 gives a positive indication, no change in step size is made, and the state shifts to 01011. In FIG. 4A the integrator output is as indicated at point L. The next comparison is positive, circuit 18 generates a signal on $p_2$ of leads 19, the integrator output is increased by two units (one-half the previous step change) as indicated at point M of FIG. 4A, and the state shifts to 00011. The negative indication from comparator 11 results in a reduction of the integrator output by one unit as shown at N in FIG. 4A and a shift to state 01000. At this point the output of the comparator 11 can be either positive or negative since point N lies on the signal curve. For illustrative purposes only it is considered to be positive, in which case the integrator output increases to point O and the state shifts to 00000. The next step is to point P, and a shift to state 11000. A negative output from the comparator 11 then causes a change of two units in the integrator output to point Q and a shift in state to 11010.

Thus far the operation of the encoder of FIG. 1 has been described without reference to the operation of combinational circuit 38. It can be seen from the diagram of FIG. 2 that for various states of the encoder, the step sizes in going to the next state are not equal and opposite. Thus in going from state 11101 to 01011 on a positive indication the change in step size is zero, whereas in going to state 11100 on a negative indication the step size is −4. If the decision threshold of comparator 11 is zero, then it is possible, for a constant signal input, and where the integrator output is close to the signal value, for the comparator to give either a plus or a minus indication. In the positive case the quantization error is minimal, but in the negative case it is greatly increased.

For a given quantization error $e_t$, it is desirable to minimize the quantization error $e_{t+1}$. Where the two possible step sizes are not equal and opposite, we designate them as $a_1$ and $a_2$ where $a_1 > a_2$. We define $$\bar{a}=\frac{a_1+a_2}{2} \qquad (1)$$

and $$a_\Delta=\frac{a_1-a_2}{2} \qquad (2)$$

then $$a_1=\bar{a}+a_\Delta \qquad (3)$$

and $$a_2=\bar{a}-a_\Delta \qquad (4)$$

and $$e_{t+1}=(e_t-\bar{a})\pm a_\Delta. \qquad (5)$$

The decision threshold on $(e_t-\bar{a})$ should be zero, in which case the decision threshold for $e_t$ should be $\bar{a}$.

Under the foregoing conditions, quantization errors are minimized by varying the decision threshold of comparator 11 of FIG. 1 in accordance with the particular state of the encoder. This change in threshold is accomplished by circuit 38 on the basis of the state signal information in elements 24, 26, 27, 28, and 29. For the state diagram of FIG. 2, the threshold for each state is shown within the circle representing the particular state. Thus, for example, state 11011 has a threshold of −½, 00100 has a threshold of +4, and so forth.

Returning now to FIG. 4A, at point Q the integrator output is less than two units greater than the analog signal, while state 11010 has a threshold of −2 associated therewith. As a consequence, even though the integrator output is slightly greater than the analog signal, comparator 11 produces a positive indication, no change in integrator output occurs as shown at point R, and the state shifts to 11011. At this point, despite the decision level of −½ for the new state, the integrator output is sufficiently greater than the signal to cause comparator 11 to produce a negative indication, a −2 is applied to the integrator whose output drops to point S and the new state becomes 11010. In this manner the integrator output follows the signal down as shown in FIG. 4A, alternating between states 11010 and 11011. At point U the encoder is in state 11011, and a positive indication is produced, increasing the integrator output by +1 and shifting the state to 01000. The encoder then shifts to its quiescent condition, alternating between states 00000 and 11000.

Figure 5:
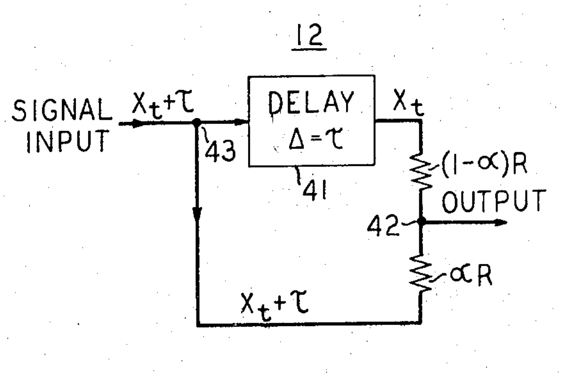
FIG. 5 is a diagram of the specialized circuit.

An examination of FIG. 4A shows that the integrator output rapidly overtakes the input signal, even a signal with a vertical rise. There is, however, a definite lag with a consequent large amount of slope overload noise. This problem is especially acute with video signals, which are characterized by steep slopes between light and dark areas of the picture. This lag in overtaking the signal can be materially reduced through use of "bogus" signal generator 12. As shown in FIG. 5, signal generator 12 comprises a delay line 41, a first resistor $(1-\alpha)R$ where $R$ is large compared to the analog signal input and delay line output impedances, and a second resistor $\alpha R$. The output of the generator is taken at point 42.

The analog signal $X_{t+\tau}$ is applied to the generator 12 and divides at point 43. The signal passes through delay line 41 and resistor $(1-\alpha)R$ and also passes through $\alpha R$. The two portions of the signal are added at 42. The output signal is given by $$\text{Bogus}=X_T\frac{\alpha R}{\alpha R+(1-\alpha)R}+X_{t+\tau}\frac{(1-\alpha)R}{\alpha R+(1-\alpha)R}$$
$$=X_t\alpha+X_{t+\tau}(1-\alpha) \qquad (6)$$

for $0<\alpha<1$

Figure 4B:
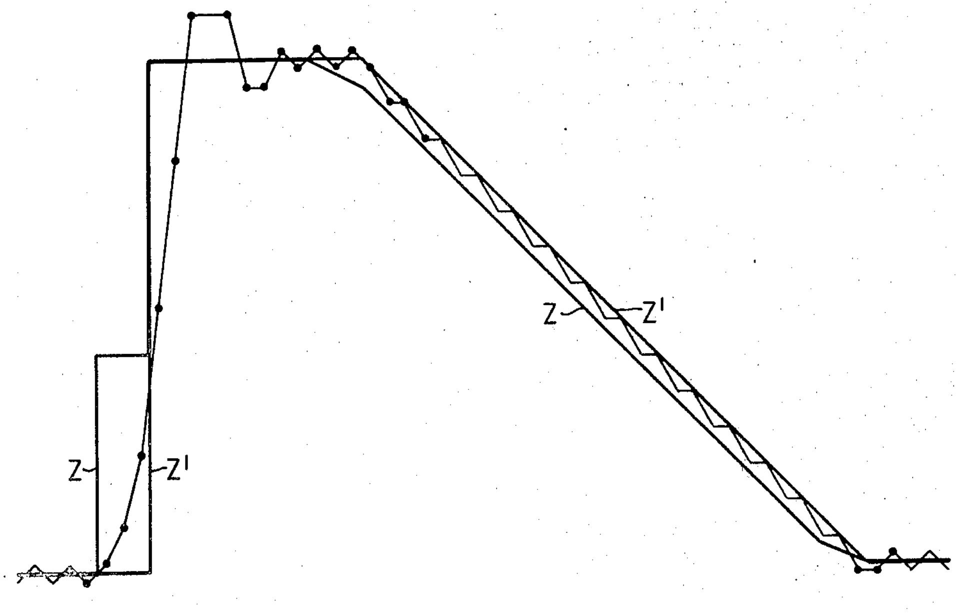
FIG. 4B is a diagram of the encoder performance as modified by the addition to the encoder of a specialized circuit.

The effect of generator 12 on the encoder performance can be seen in FIG. 4B for $\tau=3$ and $\alpha=½$. The vertically rising signal of FIG. 4A becomes a step signal (curve Z) as shown. The first step in effect gives the encoder a headstart and enables the circuit to commence escalating steps before arrival of the actual signal (curve Z'). As a consequence the integrator output more nearly approximates the actual signal, as shown. In addition, on the trailing edge, the encoder follows the bogus signal (curve Z) and thus more closely approximates the actual signal (curve Z').

As pointed out heretofore, throughout the encoding process, a positive indication from comparator 11 results in a positive pulse being transmitted from gate 16, while a negative indication results in a no-pulse, i.e., space, being transmitted.

It is to be understood, of course, that the converse arrangement may be used, or positive and negative pulses may also be used.

Figure 6:
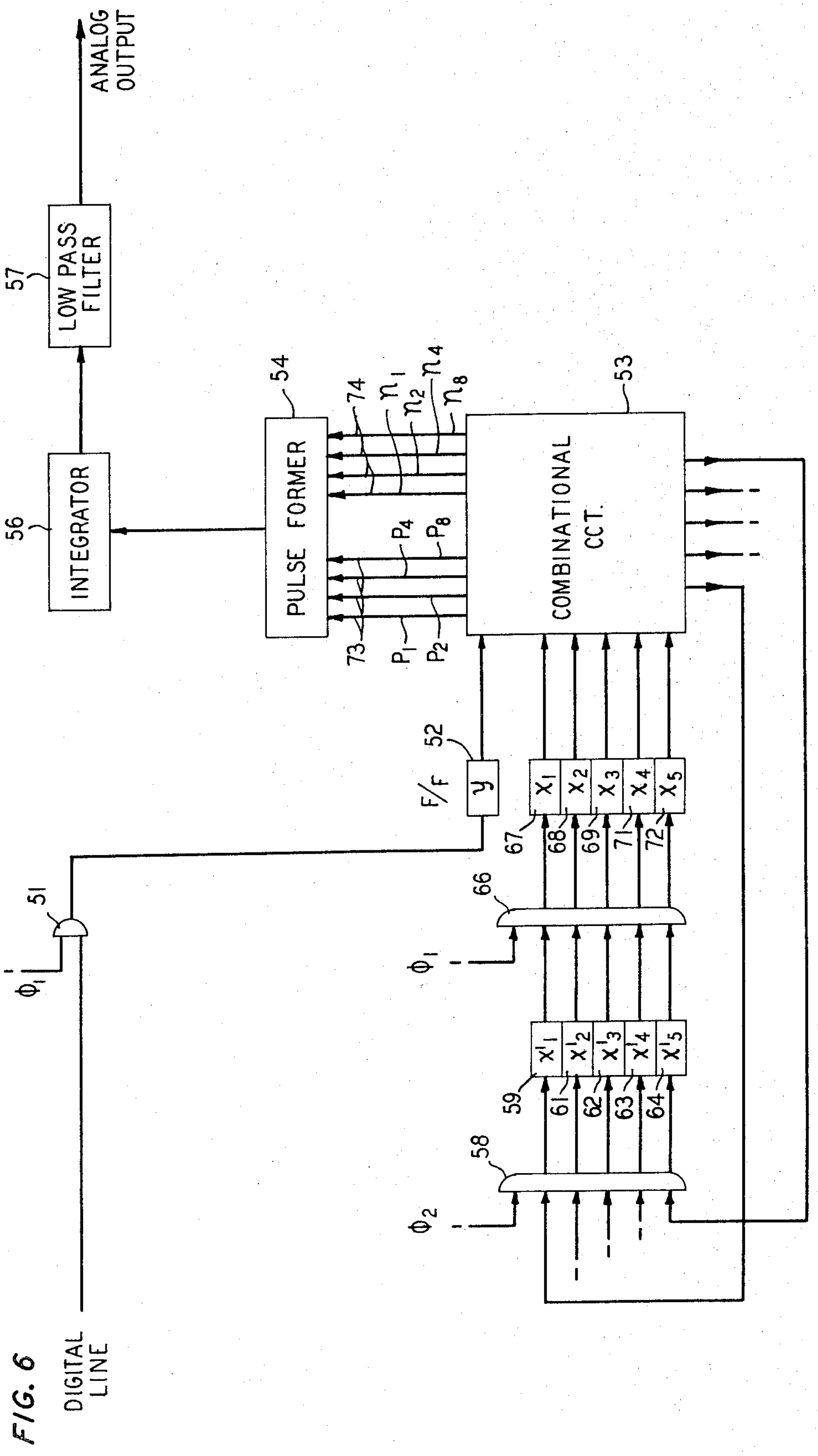
FIG. 6 is a block diagram of a decoder utilizing the principles of the invention.

As is typical in delta modulation systems, the decoder at the receiver contains virtually identical circuitry to that used in the feedback portion of the encoder. In FIG. 6 there is shown a decoder for operation on the encoded signals transmitted by the arrangement of FIG. 1 and which operates in accordance with the algorithm of the encoder. The delta modulation pulse train of the transmitted signal is applied to a gate 51 under control of a clock $0_1$, not shown, and the output of gate 51 is fed to a circuit 52, corresponding to circuit 17 of FIG. 1. The output of circuit 52 is applied to a combinational circuit 53 which functions in the same manner of circuit 18 of FIG. 1 to produce positive or negative step size signals to pulse former 54, and to feed back the five-digit state signal to gate 58. Gate 58, under control of clock signals $0_2$ gates the state signal into members 59, 61, 62, 63, and 64, whose outputs are applied to gate 66. Clock pulses $0_1$ gate the state signals into elements 67, 68, 69, 71, and 72 and thence into circuit 53. As can be seen, this sequence of operation is the same as that for FIG. 1.

The output of pulse former 54 is applied to an integrator 56 whose output passes to a low-pass filter 57. The output of the filter is an approximation of the original analog signal. It can be seen that the equivalents of combinational circuit 38 and bogus signal generator 12 are not required in the operation of the decoder.

The various elements of the encoder and decoder, such as comparator 11, integrators 13 and 56, pulse formers 22 and 54, circuits 17 and 52, and the like are circuits well known in the art. Combinational circuits 18, 38, and 53 can be relatively simple logic circuits which may be easily constructed by workers in the art once the algorithm, as set forth in FIG. 2, of the encoder-decoder is known.

It is to be understood that the delta modulation system disclosed in the foregoing is intended to represent an illustrative embodiment of the principles of the invention. Various changes and modifications of the system herein disclosed may occur to workers in the art without departing from the spirit and scope of the invention.

What is claimed is:

1. In an adaptive delta modulation signal transmission system wherein analog and digital signals are used at different points in the system, an encoder for encoding analog signals as digital signals to be transmitted, the algorithm of the encoding process being characterized by a plurality of unique states of the encoder, a comparator circuit to which the analog signals are applied, means for periodically transmitting the comparator output in digital pulse form, first means responsive to each periodic transmission and to a digital signal indicative of the state of the encoder for producing a step pulse output of a step size and polarity which is a function of the state of the encoder and of the periodic transmission, an integrator for receiving the output of said first means, the output of said integrator being applied to said comparator, said first means further producing a digital signal indicative of the new state of said encoder, storage means for storing the digital signal indicative of the state, and means for applying the stored signal to said first means simultaneously with the next succeeding periodic transmission of said encoder.

2. An encoder as claimed in claim 1 and further including second means to which the output of said storage means is applied for varying the decision level of said comparator in accordance with the state of the encoder.

3. An encoder as claimed in claim 1 and further including means to which the analog signals are applied for altering the waveform of the analog signals applied to said comparator to reduce slope overload noise.

4. An encoder as claimed in claim 3 wherein said last-mentioned means comprises a circuit for delaying a portion of the analog signal and combining it with an undelayed portion, and applying the combined signals to said comparator.

5. An adaptive delta modulation system comprising an encoder for converting analog signals to digital signals for transmission, and a decoder for converting received digital signals to analog signals, said encoder being characterized by an algorithm having a plurality of unique states, each state having a decision level associated therewith, said encoder comprising an integrator circuit, means for comparing analog signals with the output of said comparator circuit, means for transmitting at fixed time intervals a digital signal based on the comparator output, first means for receiving each successive signal transmitted and producing an output indicative of the nature of said signal, second means for receiving the output of said first means, third means for applying to said second means simultaneously with the output of said first means a signal indicative of the state of said encoder, said second means, upon receiving said signals generating a step input to said integrator, the size of said step being a function of the state of the encoder and the output of said first means, and simultaneously generating a new state signal, and storage means for storing the new state signal until the next signal transmission; said decoder comprising fourth means for receiving digital signals and producing an output indicative of the nature of said signals, fifth means for receiving the output of said fourth means, sixth means for applying to said fifth means simultaneously with the output of said fourth means a signal indicative of the state of said decoder, said fourth means, upon receiving said signals generating a step output, the size of said step being a function of the state of the encoder and the output of said fourth means, and simultaneously generating a new state signal, an integrator for receiving the step output, storage means for receiving the state signal and a low-pass filter for receiving the output of said integrator.

6. An adaptive delta modulation system as claimed in claim 5 and further including means at the encoder to which the output of said storage means is applied for varying the decision level of said comparator as a function of the state of the encoder.

* * * * *